(12) United States Patent
Warkentin et al.

(10) Patent No.: US 10,185,664 B1
(45) Date of Patent: Jan. 22, 2019

(54) METHOD FOR SWITCHING ADDRESS SPACES VIA AN INTERMEDIATE ADDRESS SPACE

(71) Applicant: VMware, Inc., Palo Alto, CA (US)

(72) Inventors: Andrei Warkentin, North Andover, MA (US); Cyprien Laplace, Boston, MA (US); Regis Duchesne, Monts-de-Corsier (CH); Alexander Fainkichen, Southborough, MA (US); Ye Li, Newton Highlands, MA (US)

(73) Assignee: VMware, Inc., Palo Alto, CA (US)

( * ) Notice: Subject to any disclaimer, the term of this patent is extended or adjusted under 35 U.S.C. 154(b) by 36 days.

(21) Appl. No.: 15/639,800

(22) Filed: Jun. 30, 2017

(51) Int. Cl.
| | | |
|---|---|---|
| *G06F 9/4401* | (2018.01) | |
| *G06F 12/1027* | (2016.01) | |
| *G06F 12/1009* | (2016.01) | |
| *G06F 9/445* | (2018.01) | |

(52) U.S. Cl.
CPC ........ *G06F 12/1027* (2013.01); *G06F 9/4401* (2013.01); *G06F 9/445* (2013.01); *G06F 12/1009* (2013.01); *G06F 2212/65* (2013.01); *G06F 2212/68* (2013.01)

(58) Field of Classification Search
CPC ....... G06F 9/4401; G06F 9/445; G06F 9/4406
See application file for complete search history.

(56) References Cited

U.S. PATENT DOCUMENTS

| | | | | |
|---|---|---|---|---|
| 8,352,718 | B1* | 1/2013 | Rao | G06F 9/4401 711/118 |
| 2001/0036109 | A1* | 11/2001 | Jha | G11C 16/22 365/185.33 |
| 2004/0210735 | A1* | 10/2004 | Shieh | G06F 12/0292 711/206 |
| 2007/0300007 | A1* | 12/2007 | Bulusu | G06F 12/0891 711/103 |
| 2008/0148034 | A1* | 6/2008 | Henry | G06F 9/4401 713/1 |
| 2009/0113196 | A1* | 4/2009 | Jan | G06F 8/654 713/2 |
| 2016/0117279 | A1* | 4/2016 | Borikar | G06F 13/4022 710/316 |

* cited by examiner

*Primary Examiner* — Midys Rojas
*Assistant Examiner* — Khoa D Doan
(74) *Attorney, Agent, or Firm* — Patterson & Sheridan, LLP

(57) ABSTRACT

A method of re-mapping a boot loader image from a first to a second address space includes: determining a difference in a virtual address of the boot loader image in the first and second address spaces; building page tables for a third address space that maps a code section within the boot loader image at first and second address ranges separated by the difference and the code section causes execution to jump from a first instruction in the first address range to a second instruction in the second address range; executing an instruction of the code section in the first address space using pages tables for the first address space; executing the first instruction and then the second instruction using the page tables for the third address space; and executing an instruction of the boot loader image in the second address space using page tables for the second address space.

18 Claims, 5 Drawing Sheets

METHOD FOR SWITCHING ADDRESS SPACES VIA AN INTERMEDIATE ADDRESS SPACE

BACKGROUND

Booting is a process of loading system software into main memory of a computer. Booting may be triggered by powering on the computer or by a soft restart that does not require power cycling of the computer. The process begins with the execution of boot firmware that performs hardware initialization, e.g., power-on self-test (POST), and is followed by loading and execution of a boot loader.

Typically, boot loaders are pieces of code that run at the boundary between hardware initialization and operating system (OS) kernels, transitioning from one environment to the other. Some boot loaders put the central processing unit (CPU) into the correct mode of operation prior to hand off to the operating system kernel, which includes enabling the memory management unit (MMU) and thus constructing the early kernel address space. Frequently, these boot loaders leverage some assumptions about the platform configuration to make the task simpler. For example, they are loaded at a certain fixed physical memory address (also referred to herein as "machine address"). Often, this address is picked in such a way that the boot loader can be mapped at virtual addresses (VA) equivalent to the machine addresses (MA), in the same address space as all loaded kernel modules and all data structures being constructed for kernel handoff, without conflict. On x86 architectures, these are often low addresses (below 4 GB), as kernel addresses generally have high address bits set.

However, the boot firmware stores the boot loader at unknown virtual addresses within its firmware address space, which is mapped to the machine address space. If machine addresses corresponding to these virtual addresses numerically overlap with virtual addresses needed for handoff to the kernel, memory conflicts would arise in situations where "identity mapping" is employed to map virtual addresses (VA) to machine addresses (MA). Example systems where conflicts might occur include those which (a) do not have memory at low addresses, (b) do not guarantee memory in any specific range, and (c) may have memory at extremely high addresses.

SUMMARY

One or more embodiments provide a method for re-mapping a boot loader image from a firmware address space to a boot loader address space so that virtual addresses mapping the boot loader image do not conflict with virtual addresses that map kernel modules and associated data structure.

According to one embodiment, a method of re-mapping a boot loader image from a first address space to a target location in a second address space, wherein first pages tables map the first address space to a machine address space and second page tables map the second address space to the machine address space, includes the steps of: (a) determining a difference in a virtual address of the boot loader image in the first address space and a corresponding virtual address of the boot loader image in the second address space; (b) building page tables for a third address space that maps a code section within the boot loader image at a first address range and a second address range, wherein the two address ranges are separated by the determined difference and the code section when executed causes execution to jump from a first instruction that is mapped in the first address range to a second instruction that is mapped in the second address range; (c) executing, in a processor, an instruction in the code section that is mapped in the first address space using pages tables for the first address space; (d) executing, in the processor, the first instruction and then the second instruction using the page tables for the third address space; and (e) executing, in the processor, an instruction in the boot loader image that is mapped in the second address space using page tables for the second address space.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
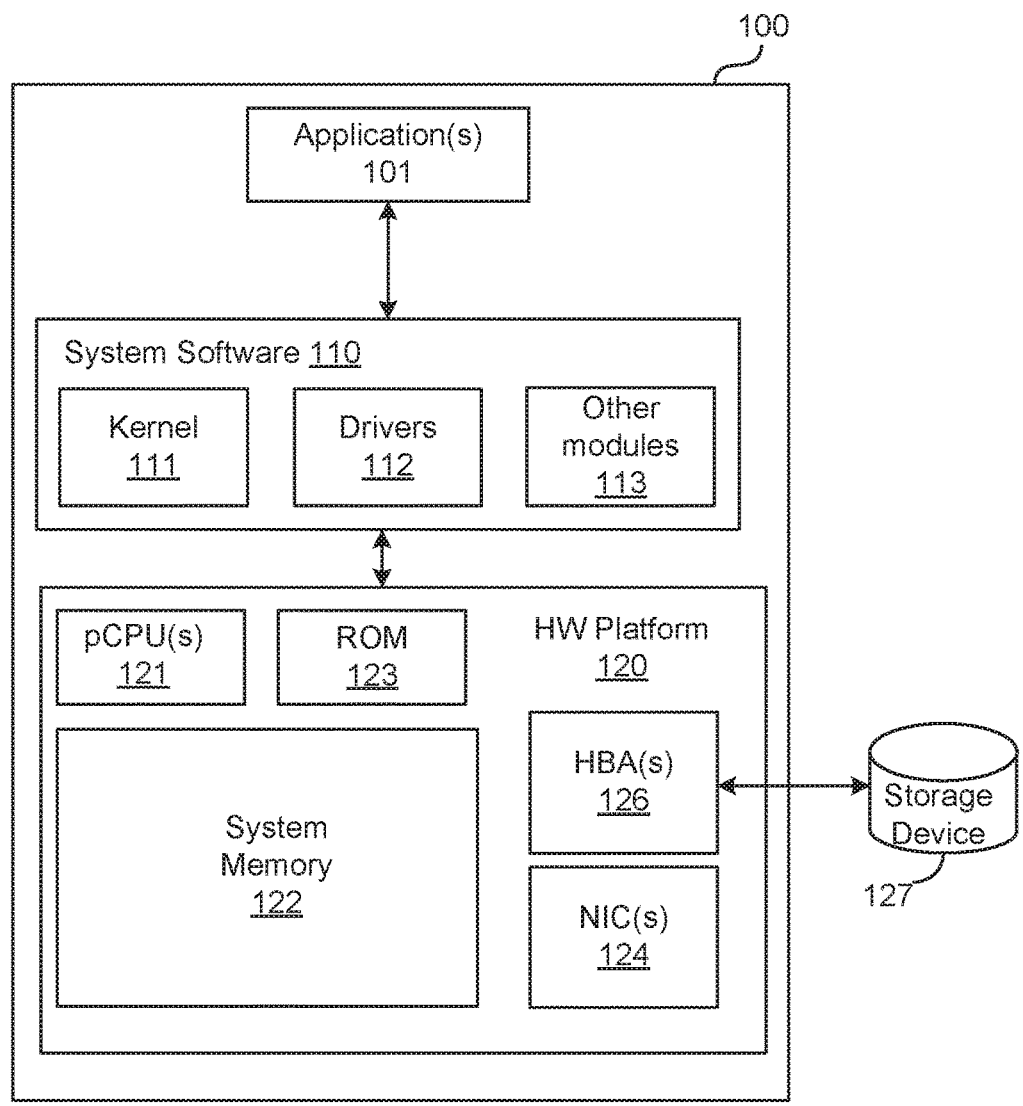
FIG. 1 is a block diagram of a computer system in which one or more embodiments may be implemented.

FIG. 1 is a block diagram of a computer system 100 in which one or more embodiments may be implemented. Computer system 100 includes one or more applications 101 that are running on top of system software 110. System software 110 includes a kernel 111, drivers 112 and other modules 113 that manage hardware resources provided by a hardware platform 120. In one embodiment, system software 110 is an operating system (OS), such as operating systems that are commercially available. In another embodiment, system software 110 is a hypervisor that supports virtual machine applications running thereon, e.g., a hypervisor that is included as a component of VMware's vSphere® product, which is commercially available from VMware, Inc. of Palo Alto, Calif. Hardware platform 120 includes one or more physical central processing units (pCPUs) 121, system memory 122 (e.g., dynamic random access memory (DRAM)), read-only-memory (ROM) 123, one or more network interface cards (NICs) 124 that connect computer system 100 to a network 130, and one or more host bus adapters (HBAs) 126 that connect to storage device(s) 127, which may be a local storage device or provided on a storage area network. In the descriptions that follow, pCPU denotes either a processor core, or a logical processor of a multi-threaded physical processor or processor core if multi-threading is enabled. In addition, each pCPU includes a memory management unit (MMU) which performs pages walks of page tables to translate virtual addresses to machine addresses, and a translation lookaside buffer (TLB) which caches mappings between virtual addresses to machine addresses.

In the embodiments illustrated herein, computer system 100 is configured in accordance with the unified extensible firmware interface (UEFI) specification. In one embodiment, computer system 100 is booted from the storage device 127 in accordance with platform firmware stored in ROM 123. In another embodiment, computer system 100 is booted from the network in accordance with platform firmware stored in ROM 123.

In addition, computer system 100 in one embodiment is an ARM®64 system in which ARM®64 processors are examples of pCPUs 121. Other embodiments of computer system 100 include computer systems that are based on other processor architectures, such as the x86 processor architecture.

Figure 2:
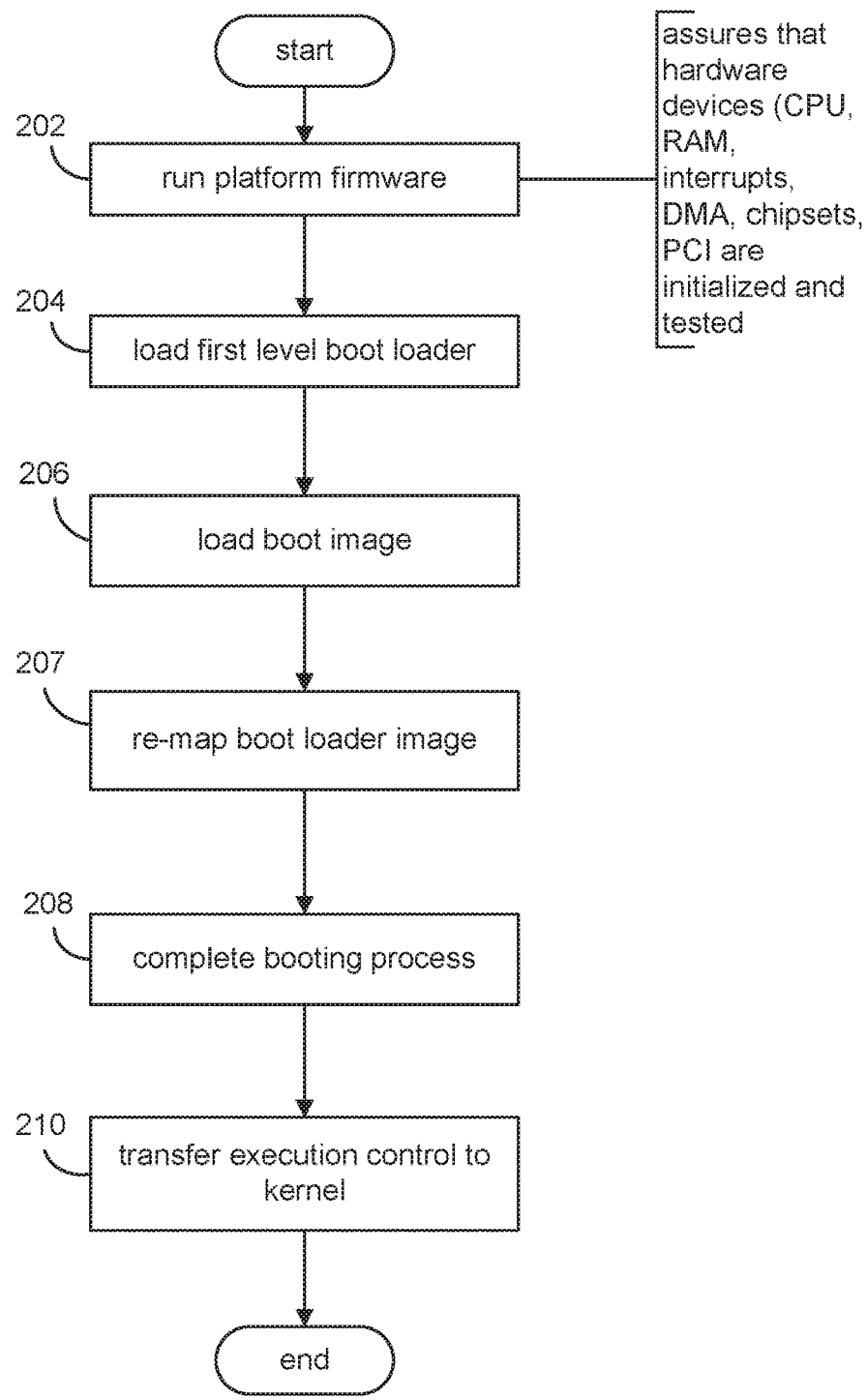
FIG. 2 is a flow diagram of a process for booting a computer system according to one or more embodiments.

During booting, the platform firmware carries out the functions of initializing and testing the various hardware devices, RAM, interrupts, DMA, chipsets, and PCI devices and controllers for correct operation. The boot process according to an embodiment involves the steps depicted in FIG. 2. In step 202, the platform firmware is executed on one of pCPUs 121 designated as the boot processor. The platform firmware provides two types of services—boot services and run-time services—code and data for which are loaded into system memory 122 and identically mapped to the virtual address space of the platform firmware. One of the boot services is power-on self-test (POST), which is carried out at step 202 to confirm that all of the hardware devices are in working order and properly initialized.

Figure 3:
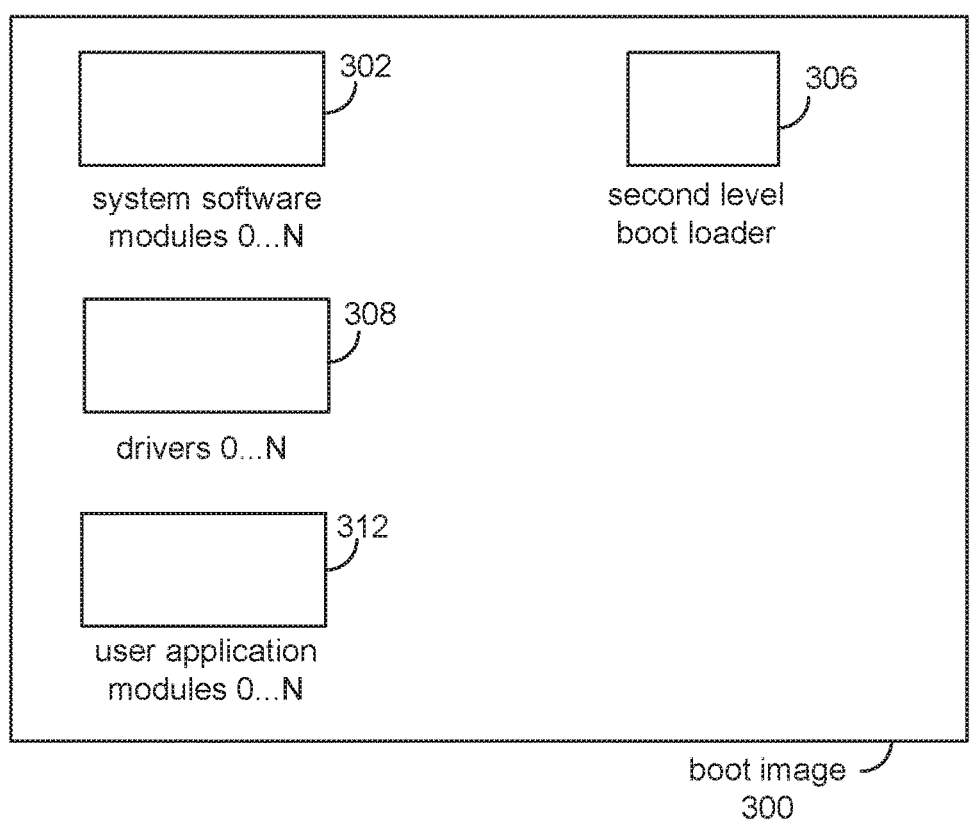
FIG. 3 depicts an example set of modules included in a boot image that is loaded into system memory during a boot process.

In step 204, the platform firmware determines the location of a first level boot loader and loads the first level boot loader into system memory 122. The job of the first level boot loader is to load into system memory 122 all of the modules contained in a boot image (e.g., boot image 300 depicted in FIG. 3, also referred to herein as the "boot-time modules"). The boot-time modules to be loaded into system memory 122 include a second level boot module 306, which includes the second level boot loader, system software modules 302, which include kernel 111, driver modules 308, which include drivers 112, and user application modules 312. In step 206, the platform firmware hands off execution control to the second level boot loader. In one embodiment, the second level boot loader includes an initial portion written in assembly language and a high-level language (HLL) portion written in a higher level language than assembly language.

Upon gaining control from the first level boot loader, the initial assembly language portion of the second level boot loader, in step 207, performs re-mapping of a boot loader image from a firmware address space to a boot loader address space of computer system 100. This re-mapping process is further described below in conjunction with FIGS. 4 and 5.

In step 208, execution control is transferred to the HLL portion of the second level boot loader. The job of this portion is to complete the booting process and then transfer execution control to kernel 111 in step 210.

Figure 4:
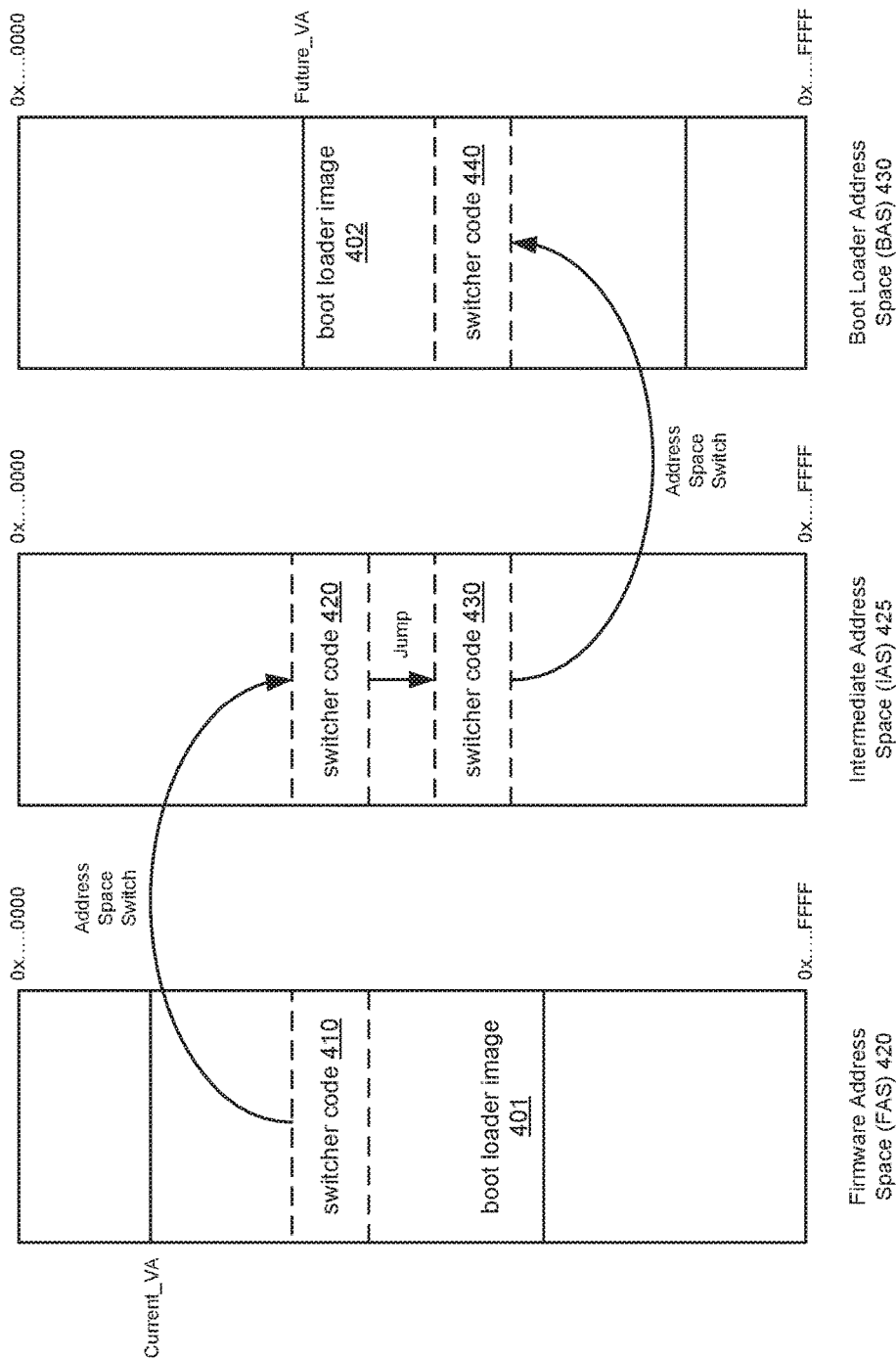
FIG. 4 is a conceptual diagram depicting a process for re-mapping a boot loader image from a firmware address space to a boot loader address space, according to one or more embodiments.

FIG. 4 is a conceptual diagram depicting a process for re-mapping an image of the second level boot loader (hereinafter referred to as "the boot loader" for simplicity) from a firmware address space to a boot loader address space, according to one or more embodiments. In FIG. 4, three virtual address spaces are shown, including a firmware address space (FAS) 420, an intermediate address space (IAS) 425, and a boot loader address space (BAS) 430. According to one or more embodiments, the boot loader image, which is initially mapped in FAS 420, is re-mapped in BAS 430 using IAS 425. The reason for the re-mapping is, as discussed above, to map the boot loader image in the same address space as the kernel modules and associated data structures without conflict.

The re-mapping process begins after the boot loader image and the boot-time modules are loaded into system memory 122 in steps 204 and 206 described above. When the boot loader image is first loaded, it is mapped in FAS 420. The initial mapping is shown in FIG. 4 as boot loader image 401 and begins at FAS virtual address labeled, Current_VA. The target for the re-mapping is shown in FIG. 4 as boot loader image 402 and begins at BAS virtual address labeled, Future_VA. This target location within BAS 430 is platform dependent and is set so that there is no conflict between the virtual address space occupied by boot loader image 402 and the kernel modules and associated data structures.

Figure 5:
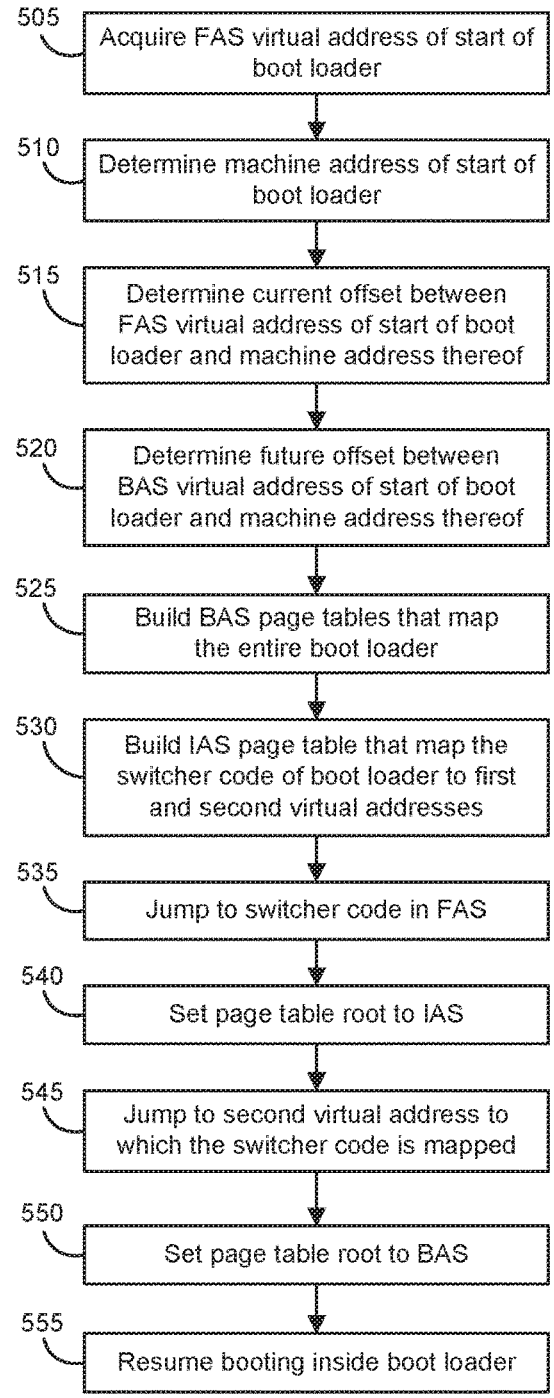
FIG. 5 is a flow diagram depicting a process for re-mapping a boot loader image from a firmware address space to a boot loader address space, according to one or more embodiments.

FIG. 5 is a flow diagram depicting a process for re-mapping the boot loader image, from boot loader image 401 in FAS 420 to boot loader image 402 in BAS 430 using IAS 425. As described above, the re-mapping process is carried out by the initial portion of the boot loader.

In step 505, the boot loader acquires Current_VA, which is the starting virtual address of boot loader image 401 that has been mapped in FAS 420. Then, in step 510, the boot loader determines a machine address (Current_MA) corresponding to Current_VA. If boot loader image 401 is identity mapped or the MMU is OFF, Current_MA will equal Current_VA. On the other hand, if the MMU is ON and boot loader image 401 is not identity mapped, the boot loader determines Current_MA by walking the page tables of FAS 420 using the MMU.

In step 515, the boot loader calculates the difference between Current_VA and Current_MA, which represents the offset (i.e., the current offset) between the location of the boot loader image in FAS 420 and the location of the boot loader image in system memory 122. The boot loader, in step 520, also calculates the difference between Future_VA and Current_MA, which represents the offset (i.e., the future offset) between the location of the boot loader image in BAS 430 and the location of the boot loader image in system memory 122.

In steps 525 and 530, the boot loader builds pages tables for BAS 430 and IAS 425. The page tables for BAS 430 are built so that they map each virtual address of boot loader image 402 to a corresponding location in system memory 122. The page tables for IAS 425 are built only to map a special section of code within the boot loader, which when executed, performs a virtual address space switch from FAS 420 to BAS 430. This special section of code, referred to herein as "the switcher code," is mapped to two different locations within IAS 425, and the two mappings are depicted in FIG. 4 as switcher code 420 and switcher code 430. The boot loader determines the location of switcher code 420 relative to Current_VA and the location of switcher code 430 relative to Future_VA.

After building the pages tables for BAS 430 and IAS 425, the boot loader performs a jump in execution in step 535 to begin execution of the switcher code. After the jump, the boot loader changes the page tables used by the MMU from the page tables for FAS 420 to the pages tables for IAS 425, by setting the page table root to point to the page tables for IAS 425 (Step 540). In conjunction with the page table switch, the boot loader re-initializes the MMU, in one embodiment, and the TLB is flushed. Then, after the page table switch to page tables for IAS 425, the boot loader performs another jump in execution in step 545. This time, the jump is to an instruction in IAS 425 that is at a virtual address that is computed by adding the difference in the current offset and the future offset to the address of the last instruction executed.

After the jump in step 545, the boot loader changes the page tables used by the MMU from the page tables for IAS 425 to the pages tables for BAS 430, by setting the page table root to point to the page tables for BAS 430 (Step 550). In conjunction with the page table switch, the boot loader initializes the MMU, in one embodiment, and the TLB is flushed. Then, after the page table switch to page tables for BAS 430, the boot loader resumes the booting process inside the boot loader. At this point, the virtual address space for the boot loader is no longer within FAS 420 and is now within BAS 430.

Thus, with a proper selection of Future_VA, conflicts between mappings for the boot loader image and mappings for the kernel modules and associated data structures can be prevented.

In the embodiments described above, the MMU is turned ON to perform the pages walks from the virtual address space, which is any one of FAS 420, IAS 425, and BAS 430, the machine address space. In an alternative embodiment, the steps of FIG. 5 are executed to re-map from FAS 420 where MMU is OFF, in which case FAS 420 would correspond to the machine address space, to BAS 430 where MMU is ON.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of re-mapping a boot loader image from a first address space to a target location in a second address space, wherein first pages tables map the first address space to a machine address space and second page tables map the second address space to the machine address space, comprising:
   (a) determining a difference in a virtual address of the boot loader image in the first address space and a corresponding virtual address of the boot loader image in the second address space;
   (b) building page tables for a third address space that maps a code section within the boot loader image at a first address range and a second address range, wherein the two address ranges are separated by the determined difference and the code section when executed causes execution to jump from a first instruction that is mapped in the first address range to a second instruction that is mapped in the second address range;
   (c) executing, in a processor, an instruction in the code section that is mapped in the first address space using pages tables for the first address space;
   (d) executing, in the processor, the first instruction and then the second instruction using the page tables for the third address space; and
   (e) executing, in the processor, an instruction in the boot loader image that is mapped in the second address space using page tables for the second address space.

2. The method of claim 1, further comprising:
   switching page tables used by a memory management unit of the processor from the pages tables for the first address space to the pages tables for the third address space between (c) and (d); and
   switching page tables used by the memory management unit of the processor from the pages tables for the third address space to the pages tables for the second address space between (d) and (e).

3. The method of claim 2, wherein a page table root includes a pointer that points to the page tables used by the memory management unit and the page tables are switched by changing the pointer of the page table root.

4. The method of claim 2, further comprising:
   after switching the page tables, initializing the memory management unit and flushing a translation lookaside buffer of the memory management unit.

5. The method of claim 1, wherein the virtual address of the boot loader image in the first address space is a starting address of the boot loader image in the first address space and the corresponding virtual address of the boot loader image in the second address space is a starting address of the target location in the second address space to which the boot loader image is being re-mapped.

6. The method of claim 5, wherein the difference in the virtual address of the boot loader image in the first address space and the corresponding virtual address of the boot loader image in the second address space is determined by:
   determining a first offset between the starting address of the boot loader image in the first address space and a machine address to which the starting address of the boot loader image in the first address space is mapped;
   determining a second offset between the starting address of the target location in the second address space to which the boot loader image is being re-mapped and the machine address; and
   determining the difference as a difference between the first offset and the second offset.

7. A non-transitory computer readable medium comprising instructions for causing a processor to perform a method of re-mapping a boot loader image from a first address space to a target location in a second address space, wherein first pages tables map the first address space to a machine address space and second page tables map the second address space to the machine address space, and the method comprises:
   (a) determining a difference in a virtual address of the boot loader image in the first address space and a corresponding virtual address of the boot loader image in the second address space;
   (b) building page tables for a third address space that maps a code section within the boot loader image at a first address range and a second address range, wherein the two address ranges are separated by the determined difference and the code section when executed causes execution to jump from a first instruction that is mapped in the first address range to a second instruction that is mapped in the second address range;
   (c) executing an instruction in the code section that is mapped in the first address space using pages tables for the first address space;
   (d) executing the first instruction and then the second instruction using the page tables for the third address space; and
   (e) executing an instruction in the boot loader image that is mapped in the second address space using page tables for the second address space.

8. The non-transitory computer readable medium of claim 7, wherein the method further comprises:
   switching page tables used by a memory management unit of the processor from the pages tables for the first address space to the pages tables for the third address space between (c) and (d); and
   switching page tables used by the memory management unit of the processor from the pages tables for the third address space to the pages tables for the second address space between (d) and (e).

9. The non-transitory computer readable medium of claim 8, wherein a page table root includes a pointer that points to the page tables used by the memory management unit and the page tables are switched by changing the pointer of the page table root.

10. The non-transitory computer readable medium of claim 8, wherein the method further comprises:
    after switching the page tables, initializing the memory management unit and flushing a translation lookaside buffer of the memory management unit.

11. The non-transitory computer readable medium of claim 7, wherein the virtual address of the boot loader image in the first address space is a starting address of the boot loader image in the first address space and the corresponding virtual address of the boot loader image in the second address space is a starting address of the target location in the second address space to which the boot loader image is being re-mapped.

12. The non-transitory computer readable medium of claim 11, wherein the difference in the virtual address of the boot loader image in the first address space and the corresponding virtual address of the boot loader image in the second address space is determined by:
    determining a first offset between the starting address of the boot loader image in the first address space and a machine address to which the starting address of the boot loader image in the first address space is mapped;
    determining a second offset between the starting address of the target location in the second address space to which the boot loader image is being re-mapped and the machine address; and
    determining the difference as a difference between the first offset and the second offset.

13. A computer system, comprising:
    a system memory in which a boot loader image, first pages tables that map a first address space to a machine address space of the system memory, and second page tables map a second address space to the machine address space of the system memory, are stored; and
    a processor including a memory management unit and a translation lookaside buffer, the processor being configured to re-map the boot loader image from the first address space to a target location in the second address space by carrying out the steps of:
    (a) determining a difference in a virtual address of the boot loader image in the first address space and a corresponding virtual address of the boot loader image in the second address space;
    (b) building page tables for a third address space that maps a code section within the boot loader image at a first address range and a second address range, wherein the two address ranges are separated by the determined difference and the code section when executed causes execution to jump from a first instruction that is mapped in the first address range to a second instruction that is mapped in the second address range;
    (c) executing an instruction in the code section that is mapped in the first address space using pages tables for the first address space;
    (d) executing the first instruction and then the second instruction using the page tables for the third address space; and
    (e) executing an instruction in the boot loader image that is mapped in the second address space using page tables for the second address space.

14. The computer system of claim 13, wherein the steps further comprise:
    switching page tables used by the memory management unit from the pages tables for the first address space to the pages tables for the third address space between (c) and (d); and
    switching page tables used by the memory management unit from the pages tables for the third address space to the pages tables for the second address space between (d) and (e).

15. The computer system of claim 14, wherein a page table root includes a pointer that points to the page tables used by the memory management unit and the page tables are switched by changing the pointer of the page table root.

16. The computer system of claim 14, wherein the steps further comprise:
    after switching the page tables, initializing the memory management unit and flushing the translation lookaside buffer.

17. The computer system of claim 13, wherein the virtual address of the boot loader image in the first address space is a starting address of the boot loader image in the first address space and the corresponding virtual address of the boot loader image in the second address space is a starting address of the target location in the second address space to which the boot loader image is being re-mapped.

18. The computer system of claim 17, wherein the difference in the virtual address of the boot loader image in the first address space and the corresponding virtual address of the boot loader image in the second address space is determined by:
    determining a first offset between the starting address of the boot loader image in the first address space and a machine address to which the starting address of the boot loader image in the first address space is mapped;
    determining a second offset between the starting address of the target location in the second address space to which the boot loader image is being re-mapped and the machine address; and
    determining the difference as a difference between the first offset and the second offset.

* * * * *